US006615192B1

United States Patent
Tagawa et al.

(10) Patent No.: US 6,615,192 B1
(45) Date of Patent: Sep. 2, 2003

(54) CONTENTS COPYING SYSTEM, COPYING METHOD, COMPUTER-READABLE RECORDING MEDIUM AND DISC DRIVE COPYING CONTENTS BUT NOT A CIPHER KEY VIA A HOST COMPUTER

(75) Inventors: Kenji Tagawa, Katano (JP); Mitsuhiro Inoue, Studio City, CA (US); Shunji Harada, Osaka (JP); Masayuki Kozuka, Arcadia, CA (US); Shoichi Aoyama, Hirakata (JP); Yukako Ohtani, Moriguchi (JP); Noboru Hirata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/523,657

(22) Filed: Mar. 10, 2000

(30) Foreign Application Priority Data

Mar. 12, 1999 (JP) .............................................. 11-066404
Apr. 14, 1999 (JP) .............................................. 11-106773

(51) Int. Cl.$^7$ ............................................. G06F 17/60
(52) U.S. Cl. ............................ 705/57; 705/1; 705/50; 705/51
(58) Field of Search ............................ 705/1, 50, 51, 705/52, 56, 57

(56) References Cited

U.S. PATENT DOCUMENTS

| | | | | |
|---|---|---|---|---|
| 5,754,649 A | * | 5/1998 | Ryan et al. | 380/203 |
| 5,892,900 A | * | 4/1999 | Ginter et al. | 713/200 |
| 5,923,754 A | * | 7/1999 | Angelo et al. | 705/54 |
| 6,070,799 A | * | 6/2000 | Ashe | 369/47.12 |
| 6,343,281 B1 | | 1/2002 | Kato | |
| 6,360,320 B1 | | 3/2002 | Ishiguro et al. | |

FOREIGN PATENT DOCUMENTS

| | | | |
|---|---|---|---|
| EP | 880088 A2 | * 11/1998 | ............. G06F/1/00 |
| JP | 7-84852 | 3/1995 | |
| JP | 11-7705 | 1/1999 | |
| JP | 11-39795 | 2/1999 | |
| JP | 11-53264 | 2/1999 | |

OTHER PUBLICATIONS

PC Magazine, v16, n2, p164, Alfred Poor, "21$^{st}$ century storage".*

* cited by examiner

*Primary Examiner*—James P. Trammell
*Assistant Examiner*—Calvin Loyd Hewitt, II
(74) *Attorney, Agent, or Firm*—Wenderoth, Lind & Ponack, L.L.P.

(57) ABSTRACT

A content copying system is formed from a host computer and connected disc drive, a removable recording medium being loaded into the latter. When the removable recording medium loaded into the disc drive is DVD-Audio, the disc drive reads a title, recorded on the recording medium and outputs it to the host computer, where it is-stored in a hard disk. When the removable recording medium loaded into the disc drive is DVD-RAM, the disc drive has the host computer read the title recorded in the hard disk, and records this title onto the DVD-RAM. The disc drive does not increment the number of copies made for a title when it is read from DVD-Audio and recorded in the hard disk in the host computer, but only when it is read from the hard disk and recorded onto DVD-RAM.

2 Claims, 13 Drawing Sheets

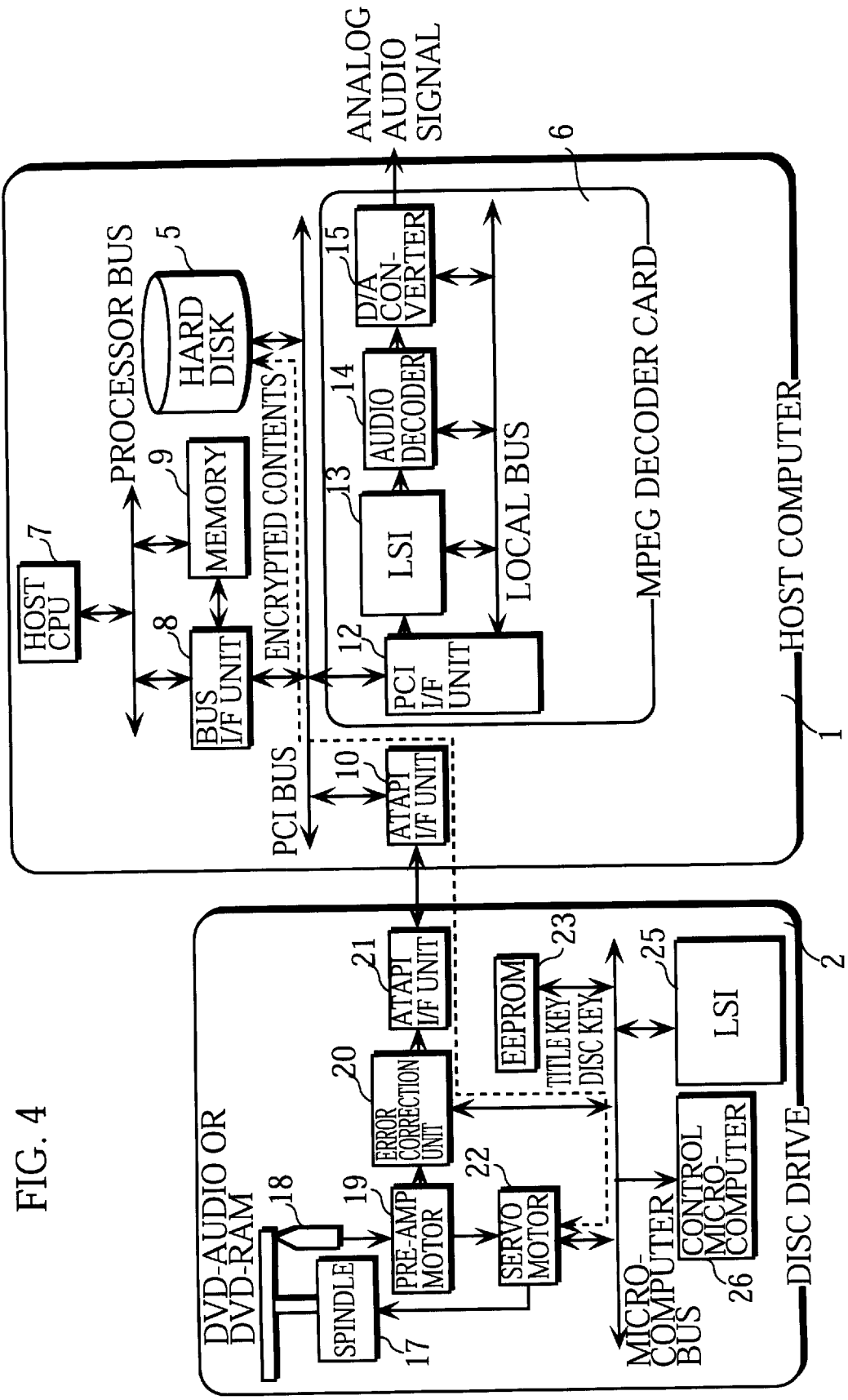

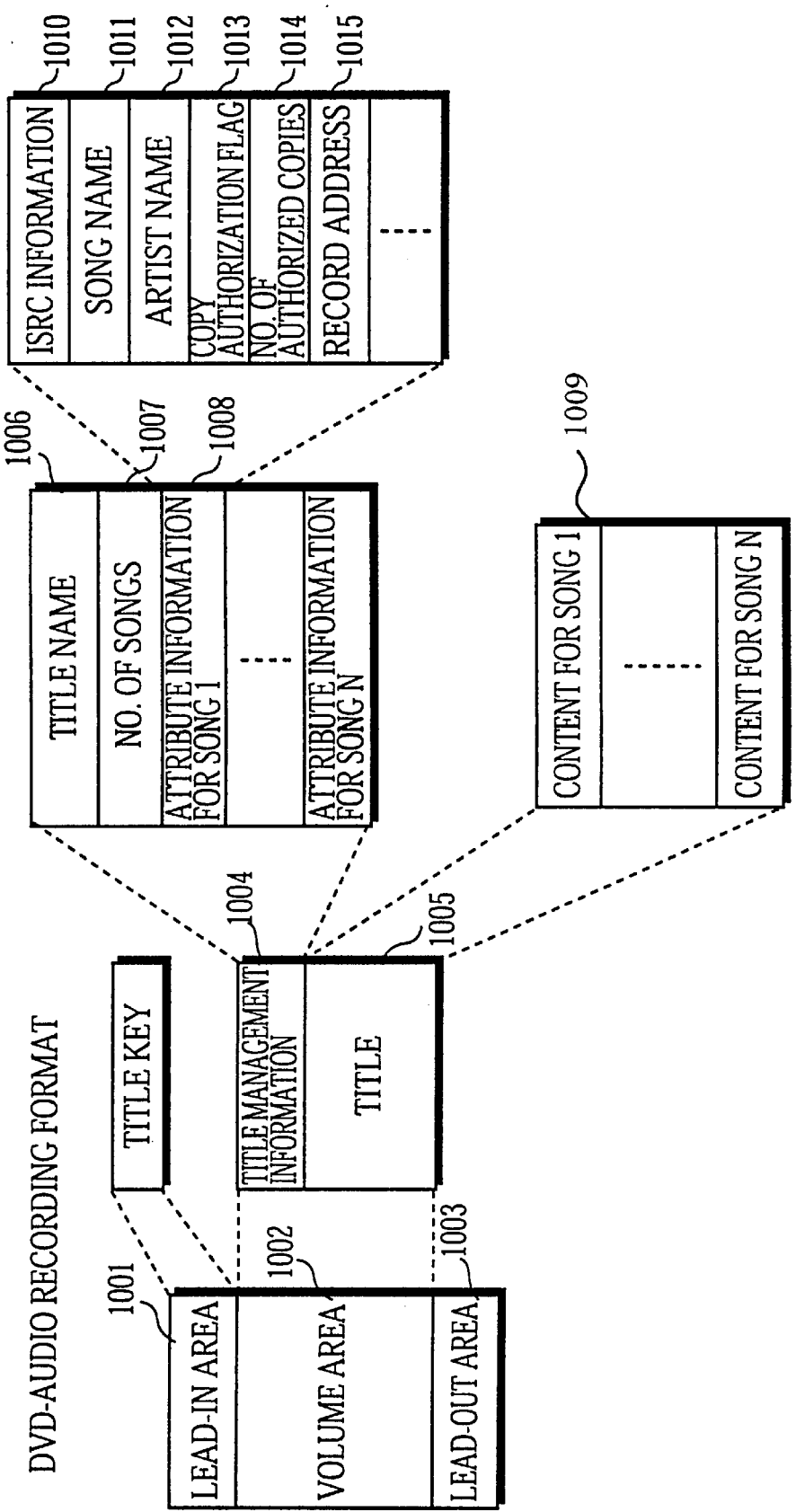

FIG. 7

TITLE NAME: ALBUM ver. 1

| SONG NAME (1201) | ARTIST NAME (1202) | TIME RECORDED (1203) | COPY AUTHORIZED (1204) |
|---|---|---|---|
| Song 1 | Singer 1 | 4 MIN 43 S | Yes |
| Song 2 | Singer 2 | 3 MIN 39 S | Yes |
| Song 3 | Singer 3 | 3 MIN 22 S | Yes |
| Song 4 | Singer 4 | 4 MIN 07 S | Yes |
| Song 5 | Singer 5 | 4 MIN 15 S | Yes |

PLAY-BACK | COPY TITLE | COPY CONTENT

FIG. 9

| CONTENT ID INFORMATION 1106 | MEDIA ID INFORMATION 1107 | TITLE KEY | DISC KEY | NO. OF COPIES 1108 |
|---|---|---|---|---|
| JPABC9812345 | M001A | △△△ | xxx | 1 |
| JPABC9812346 | M001A | △△△ | xxx | 1 |
| JPABC9812347 | M001A | △△△ | xxx | 1 |
| JPABC9812348 | M001A | △△△ | xxx | 1 |
| JPABC9812349 | M001A | △△△ | xxx | 1 |
| JPABC9801234 | M346B | △△△ | xxx | 1 |
| JPABC9801235 | M346B | △△△ | xxx | 1 |
| JPABC9801236 | M346B | △△△ | xxx | 1 |

FIG. 11

ATTRIBUTE INFORMATION TABLE

| FILE PATH INFORMATION | FILE ATTRIBUTE | TIME RECORDED |
|---|---|---|
| C:/temp/xxx.dat | TEMPORARY STORAGE | APRIL 1, 1999 |
| C:/temp/yyy.dat | TEMPORARY STORAGE | APRIL 1, 1999 |
| C:/user/zzz.dat | REWRITABLE | MARCH 20, 1999 |
| C:/trash/aaa.dat | TEMPORARY STORAGE TIMED OUT | MARCH 18, 1999 |
| C:/user/bbb.dat | READ-ONLY | FEBRUARY 1, 1998 |

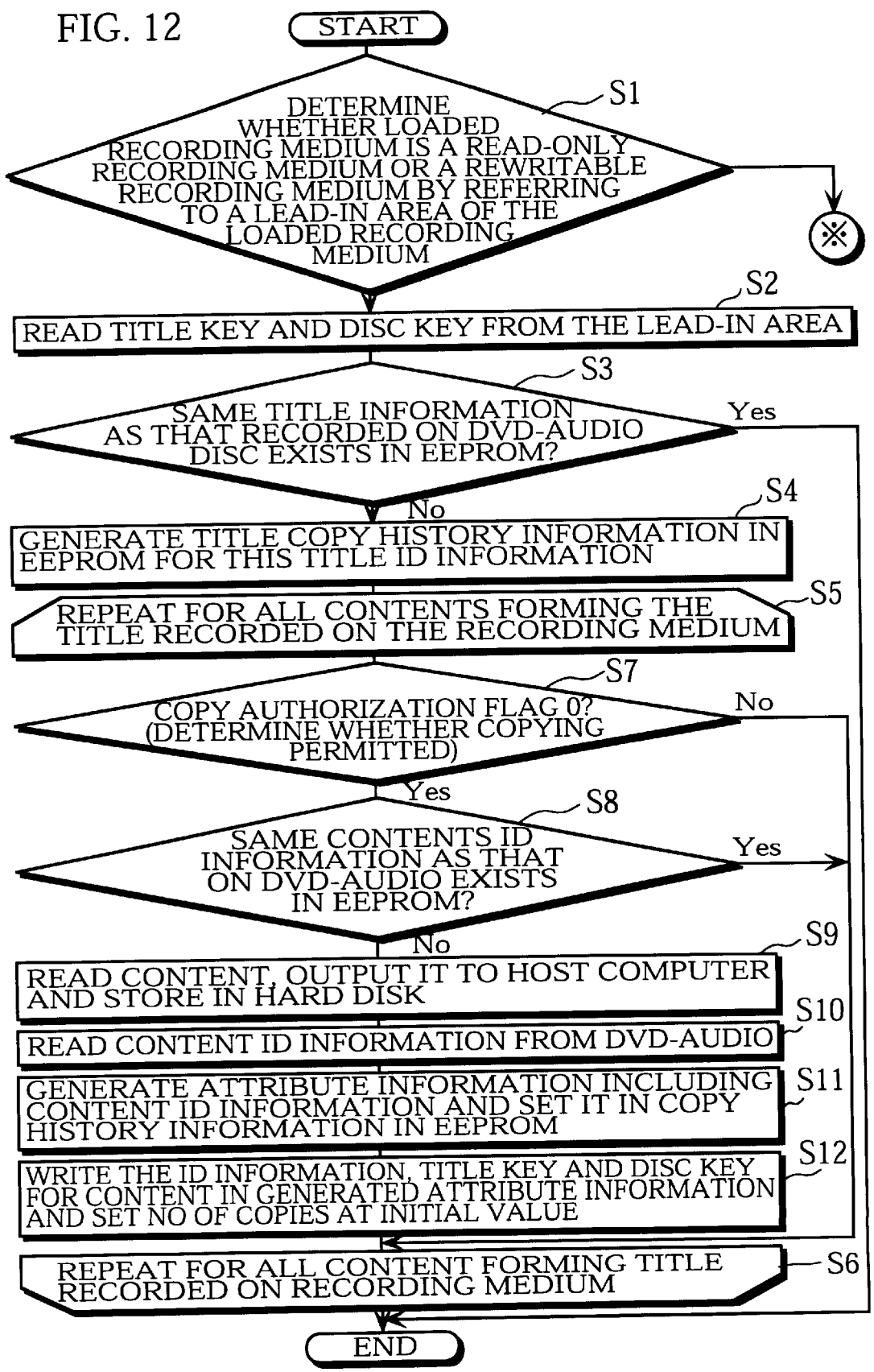

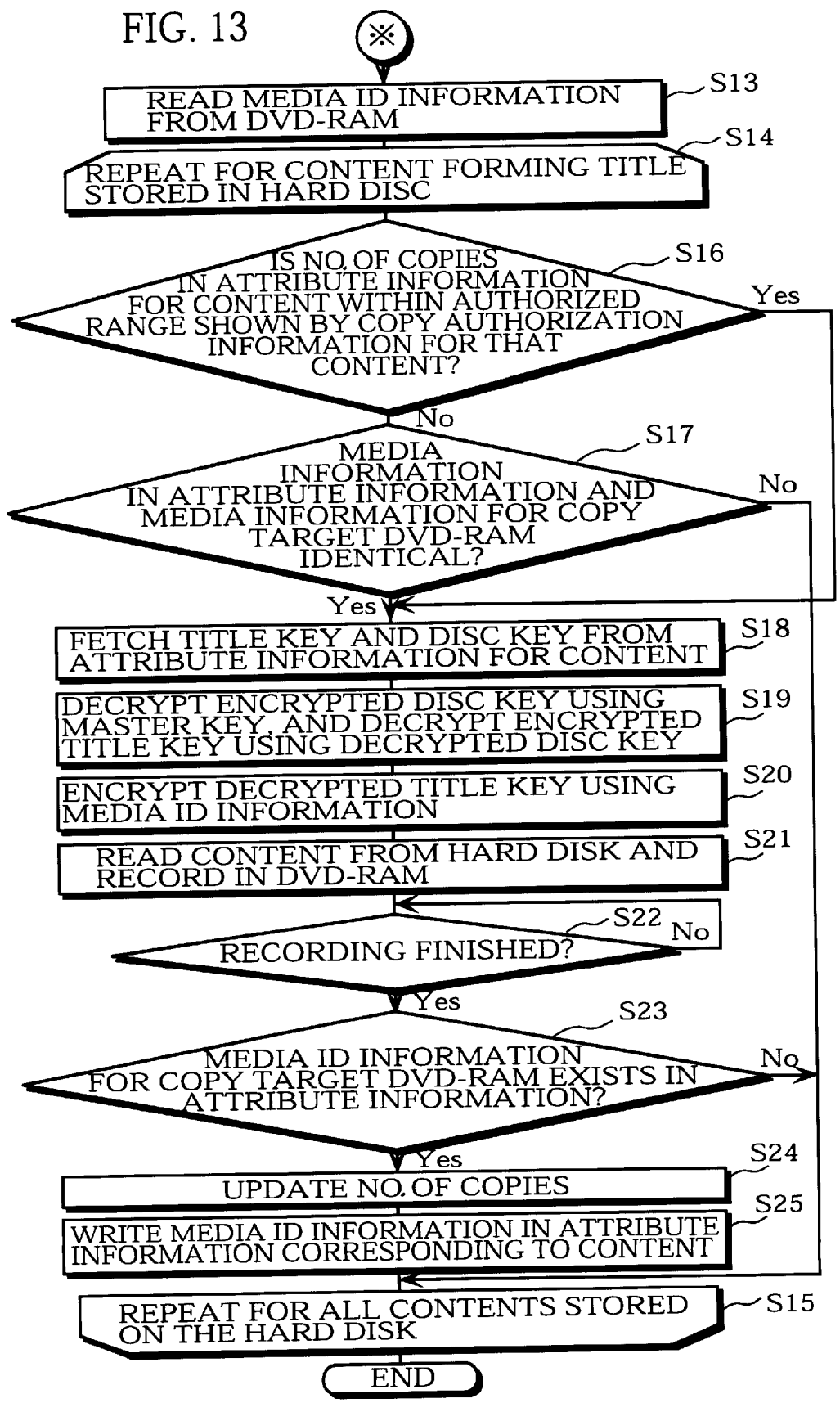

CONTENTS COPYING SYSTEM, COPYING METHOD, COMPUTER-READABLE RECORDING MEDIUM AND DISC DRIVE COPYING CONTENTS BUT NOT A CIPHER KEY VIA A HOST COMPUTER

This application is based on applications No. 11-066404 and 11-106773 filed in Japan, the content of which is hereby incorporated by reference.

BACKGROUND OF THE INVENTION

1. Field of the Invention

The present invention relates to a contents copying system, copying method, computer-readable recording medium and disc drive copying contents recorded on one recording medium onto a different recording medium.

2. Description of the Background Art

DVD-ROMs (Digital Versatile Disc Read-Only Memory) and DVD-RAMs (Digital Versatile Disc Random Access Memory) are portable optical discs which can store 4.7 gigabytes of data on a single side, despite having a diameter of only 120 mm. Such discs are soon expected to come into widespread use. Since both have a logical format ideally suited for recording computer data, movies and music, it is likely that disc drives capable of accessing both DVD-ROMs and DVD-RAMs will be provided as standard equipment in most personal computers in the near future.

When the DVD-ROM format used is DVD-Audio, the copyright owner requires that copying of data stored on a disc be strictly limited using a standard DVD copyright protection method and CCI (Copy Control Information). The following is a brief outline of such a method. First, a content is recorded on a recording medium such as a DVD-Audio disc after being encrypted using a cipher key (generally known as the title key) determined by the content owner. One title key is generally provided for each group of contents, or title, and one or more titles may be recorded on a single disc. The title key is encrypted using a cipher key unique to that particular DVD-Audio disc (generally known as the disc key) and recorded in a sector header area on the DVD-Audio disc. The disc key itself is encrypted using another cipher key (generally known as the master key) determined by the manufacturers of contents decoders, and recorded in a lead-in area of the DVD-Audio disc. The sector header area and the lead-in area cannot be accessed by ordinary users, making it extremely difficult to obtain title keys recorded on the DVD-Audio disc.

The following is an explanation of how the contents are used by devices.

The above described DVD copyright protection method does not restrict the transmission of encrypted contents between devices, but rather completely prohibits the output of unencrypted contents between devices. Furthermore, the method imposes strict limitations on the transfer of title keys between devices. This applies both to when two devices such as a DVD-Audio drive and a contents decoder are connected and contents reproduced, and to when two devices such as a DVD-Audio drive and a DVD-RAM drive are connected and contents are copied from DVD-Audio onto DVD-RAM. Basically, a title key can only be transmitted if two devices have successfully performed mutual authentication, thereby confirming whether they are legitimate devices compliant with the DVD copyright protection standard. Here, a title key is not transmitted between the devices after being encrypted by the disc key, but is transmitted after being encrypted by another cipher key (the session key) which was shared by the devices when mutual authentication was performed. FIG. 1A shows a contents reproduction system formed from a connected DVD-Audio disc drive and contents decoder. The disc drive in the drawing has a disc access unit 101 for reading contents from a DVD-Audio disc, and a bus authentication unit 102 for performing mutual authentication with a connected device via a bus, and the decoder has a bus authentication unit 103 for performing mutual authentication with a connected device via a bus, a descrambler 104 for descrambling encrypted contents using a title key, and an audio decoder 105 for reproducing contents that have been descrambled. In the drawing, the title key is transferred after the bus authentication units 102 and 103 have authenticated each other, thereby enabling the reproduction of contents to be prohibited if a bogus device has been connected.

Finally, the copying of contents between two connected disc drives is explained. Copying performed by a standard computer system, or so-called file copying, is performed by reading contents recorded on an original recording medium and recording it unchanged onto a target recording medium. Legitimate contents copying, however, cannot take place simply by reading encrypted contents recorded on an original recording medium and recording it onto a copy target. Additional processing needs to be performed before this procedure can truly be referred to as contents copying. In this processing, a title key recorded on the original recording medium is read and decrypted using the disc and master keys, then information unique to the target recording medium is read from the target recording medium and used to reencrypt the title key before it is recorded on the target recording medium. The processing for decrypting and then reencrypting a title key is necessary in contents copying because the decoder in the contents reproduction system of FIG. 1A requires the connected disc drive to transfer a legitimate title key.

Contents copying is performed as in the above description. Under the DVD-Video standard, such contents copying has been completely prohibited at the request of the video contents providers. In the case of audio contents, however, making copies for personal use, such as from CD to MD (Mini Disc™), is widely accepted, and so there was a need to accommodate such copying under the DVD-Audio standard. CCI (Copy Control Information) is specified by the DVD-Audio standard to enable contents copying to be performed under certain conditions. CCI corresponding to each content is set in a DVD-Audio disc. CCI may be set at any one of four.levels for each content. These levels are 'copy free' allowing copies to be made freely, 'copy once' allowing a first-generation copy to be made, 'no more copies' prohibiting additional copies being made, and 'never copy' prohibiting copying altogether. When CCI for a content is 'copy once', the number of copies may be set at between one and ten.

A DVD-Audio disc drive is equipped with a copy authorization control unit that determines whether copies are authorized by referring to CCI. This means that the copy authorization control unit holds copy management information, consisting of ID information for the contents which have already been recorded on the DVD-RAM, and a number of copies showing the number of times that each content has been recorded. When a content is recorded on DVD-RAM, the copy authorization control unit is responsible for increasing the number of copies, and prohibiting copying after the number of copies reaches the number shown in the CCI. If the CCI shows that contents copying is authorized by the copy authorization control unit, the title key is transmitted between the devices via mutual authentication, as explained above, and recorded on DVD-RAM. FIG. 1B shows a contents copying system formed from two connected disc drives: a playback drive (player) for reading contents from a DVD-Audio disc, and a recorder drive (recorder) for recording contents on DVD-RAM. The player and recorder in the contents copying system shown in the drawing respectively include disc access units 111 and 112 accessing DVD-Audio and DVD-RAM, bus authentication units 113 and 114 performing mutual authentication via a bus, and copy authorization control units 115 and 116 determining what restrictions have been placed on copying the contents of the DVD-Audio disc. Only if the copy authorization control units 115 and 116 determine that copying is authorized, and bus authentication units 113 and 114 confirm the authenticity of the opposing device in each case, is encrypted contents copied from DVD-Audio onto DVD-RAM, along with the encrypted title key.

However, an individual user must acquire both the player for reading contents from DVD-Audio and the recorder for recording contents onto DVD-RAM if they wish to copy audio contents, so that the need to purchase two disc drives, which may place an unnecessary economic burden on users. In particular, even though many DVD-RAM recorders are also capable of playback, neither the DVD-Audio nor copyright protection standards disclose any techniques for copying contents using only one such drive.

SUMMARY OF THE INVENTION

A first object of the invention is to provide a content copying system and disc drive capable of content copying when the playback and record functions are included in the same disc drive.

A second object is to provide a content copying system and disc drive capable of copying contents from a first recording medium to a second recording medium, even when transmission of a cipher key between devices is strictly limited in accordance with the DVD copyright protection standard.

Suppose the disc drive is connected to a host computer having an internal hard disk. Here, the host computer is provided with a bus authentication unit 114, and a copy authorization control unit 115, so that it should be possible to perform the above-mentioned content copying between the disc drive and the host computer. This may be performed by having the disc drive read a cipher key and a content stored on DVD-Audio, and storing the content and cipher key into the hard disk inside the host computer, reading them from the hard disk to be stored onto DVD-RAM. However, performing content copying by making a further copy onto DVD-RAM of a content and cipher key copied onto the hard disk is equivalent to making a second generation copy.

Under the DVD-Audio standard, contents often have a CCI set at 'copy once' in order to prevent content proliferation. As a result, content copying performed via the hard disk of the host computer is equivalent to a second generation copy and may be prohibited by the copy authorization unit 116.

In order to prevent such copying being equivalent to second generation copying, as well as to achieve the first and second objects, a content copying system with the following construction is provided. This content copying system includes a host computer and a disc drive and makes first generation copies, but prohibits second generation copies onwards. The disc drive includes a first unit and a second unit. When a first recording medium has been loaded, the first unit reads an encrypted content and a cipher key from the first recording medium, transmits the encrypted content to the host computer and stores the cipher key inside the disc drive. When a rewritable second recording medium is loaded after the first recording medium has been loaded, the second unit obtains the encrypted content from the host computer and the cipher key stored inside the disc drive, and records the obtained encrypted content and cipher key onto the second recording medium. In this content copying system, a single disc drive combining both playback and record functions is connected to a host computer having a hard disk, enabling legitimate content copying to be performed from a first recording medium onto a second recording medium. Since the user does not need to acquire two disc drives, content copying can be realized at low cost. Here, an encrypted content is copied by transmitting it from the first recording medium to the host computer and then from the host computer to the second recording medium, but the cipher key is not transmitted to the host computer. Since the encrypted content is not transmitted to the host computer together with the cipher key, this does not correspond to content copying as disclosed by the DVD copyright protection standard. This is because the transmission of a content from the host computer to the second recording medium does not correspond to a second generation copy, so that even if the CCI prohibits second generation copies of the content, it can still be copied from the first recording medium onto the second recording medium.

The content copying system may also have the following construction. Here, the first recording medium holds a piece of identification (ID) information with a linked piece of copy limiting information, the piece of ID information identifying the encrypted content recorded on the first recording medium, and the piece of copy limiting information indicating how many first generation copies are authorized for the encrypted content. The disc drive includes a secure storage medium and a setting unit. When the encrypted content is transmitted to the host computer, the setting unit sets the piece of ID information, the linked piece of copy limiting information, and an initial value for a copy number showing how many first generation copies of the content have been made, in the secure storage medium. The second unit includes a recording unit and an updating unit. When a rewritable second recording medium is loaded after the first recording medium has been loaded, the recording unit records the encrypted content and the cipher key onto the second recording medium. The updating unit updates the copy number stored in the secure storage medium each time recording is performed by the recording unit. In the above construction, the copy number is not incremented when the encrypted content is transmitted to the host computer and stored in the hard disk, but only when the encrypted content is recorded onto the second recording medium, so the content can be used by the second recording medium. This means that the user can take the second recording medium one which the content has been recorded, and playback the content in a variety of devices, including component sound systems, and portable sound systems.

The content copying system may also have the following construction. Here, the disc drive includes, a comparing unit and a duplicate ID information determining unit. When one of the second recording medium and another second recording medium is loaded after recording of the encrypted content has been completed by the recording unit, the comparing unit compares the copy number and the piece of copy limiting information for the encrypted content. The duplicate ID information determining unit determines whether the media ID information for the loaded second recording medium has already been written into the secure storage medium, linked to the piece of ID information for the encrypted content. The recording unit records the encrypted content from the host computer onto the loaded second recording medium when the copy number is less than the piece of copy limiting information for the encrypted content, or the duplicate ID information determining unit determines that the media ID information for the loaded second recording medium has already been set in the secure storage medium. In this construction, if the content recorded on the second recording medium was mistakenly deleted by the user, a special copy of the content from the host computer onto the second recording medium may be permitted even if the number of copies exceeds the copy limiting number, thereby allowing the deleted content to be reconstructed. This is permitted if the media ID for the second recording medium is the same as that for a second recording medium onto which the content has previously been copied.

The content copying system may also have the following construction. Here, the cipher key has been encrypted using a disc key unique to the first recording medium, and recorded on the first recording medium. The first unit includes a cipher key setting unit for fetching the disc key unique to the first recording medium and writing the fetched disc key into the secure storage medium inside the disc drive, so as to link the disc key to the cipher key. The second unit includes a cipher key descrambler for decrypting the encrypted cipher key stored in the secure storage medium once the second recording medium has been loaded, using the disc key unique to the first recording medium, a cipher key scrambler that reads the media ID information for the second recording medium, and encrypts the decrypted cipher key using the media ID information for the second recording medium; and a cipher key recording unit that records the cipher key encrypted by the cipher key scrambler onto the second recording medium. In this construction, the cipher key is encrypted by unique media ID information for the second recording medium when recorded onto the second recording medium, thereby enabling content copying to be performed while following the stipulations made in the DVD copyright protection method.

The content copying system may also include a host computer and a disc drive, that makes first generation copies, but prohibits second generation copies onwards, by recording an encrypted content and a cipher key recorded on a first recording medium onto a second recording medium. The disc drive includes the following. A reading unit reads an encrypted content and a cipher key from a first recording medium when the first recording medium is loaded. A temporary storage key holding unit holds a temporary storage key differing from the cipher key. A first scrambler decrypts, using the cipher key, the encrypted content read from the first recording medium, then encrypts the decrypted content using the temporary storage key held in the temporary storage key holding unit and transmits the encrypted content to the host computer. When a rewritable second recording medium is loaded after the first recording medium has been loaded, a second scrambler decrypts, using the temporary storage key, the encrypted content obtained from the host computer, and then encrypts the decrypted content using the cipher key. A recording unit records the content encrypted by the second scrambler onto the second recording medium. In this construction, the content is encrypted using a temporary storage key when stored temporarily in the hard disk inside the host computer. This temporary storage key differs from the cipher key used to encrypt the content when it is stored on the first recording medium. This means that if the content stored on the hard disk inside the host computer is illegally analyzed, the risk of the cipher key being exposed is reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 4 shows the internal construction of the contents copying system;

FIG. 6 shows the data construction of a read-only DVD-Audio disc;

FIG. 7 shows an interactive screen used for receiving instructions to copy and reproduce contents;

FIG. 9 shows an example of attribute information for audio contents;

FIG. 11 shows an example of an attribute information table;

FIG. 12 is a flowchart showing the processing performed in a disc drive 2 when contents are copied; and FIG. 13 is a flowchart showing the processing performed in the disc drive 2 when contents are copied.

DESCRIPTION OF THE PREFERRED EMBODIMENTS

First Embodiment

Figure 1A:
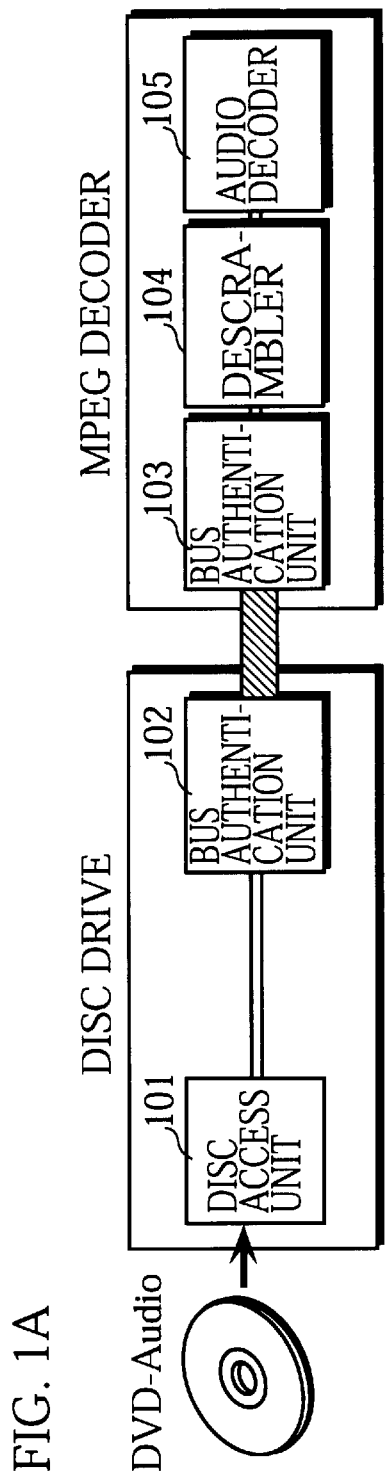
FIG. 1A shows a contents reproduction system composed of a connected DVD-Audio drive and contents decoder.
Figure 1B:
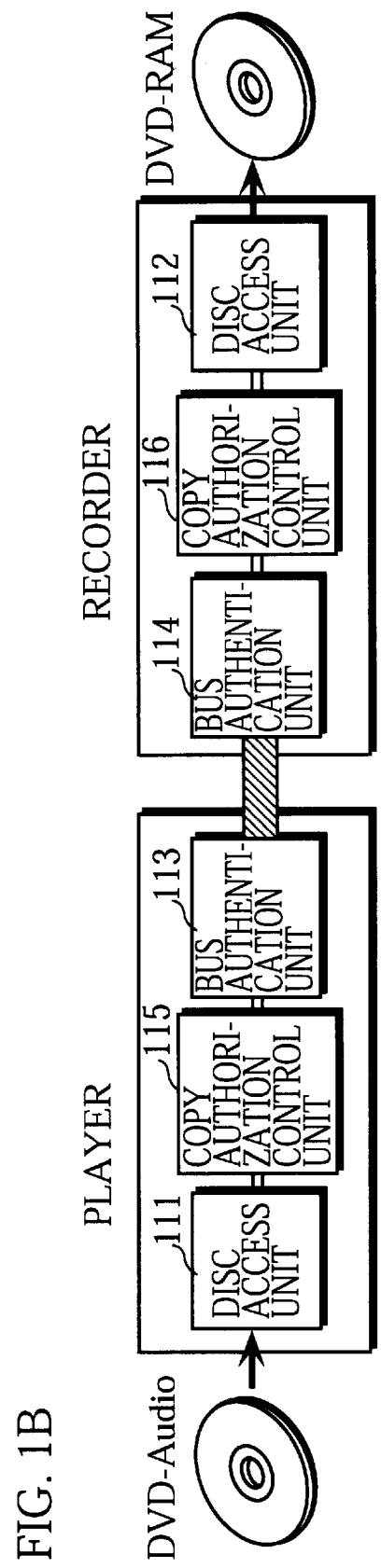
FIG. 1B shows a contents copying system in which a disc drive reading contents from a DVD-Audio disc (a player) and a disc drive recording contents on DVD-RAM (a recorder) are connected.
Figure 2:
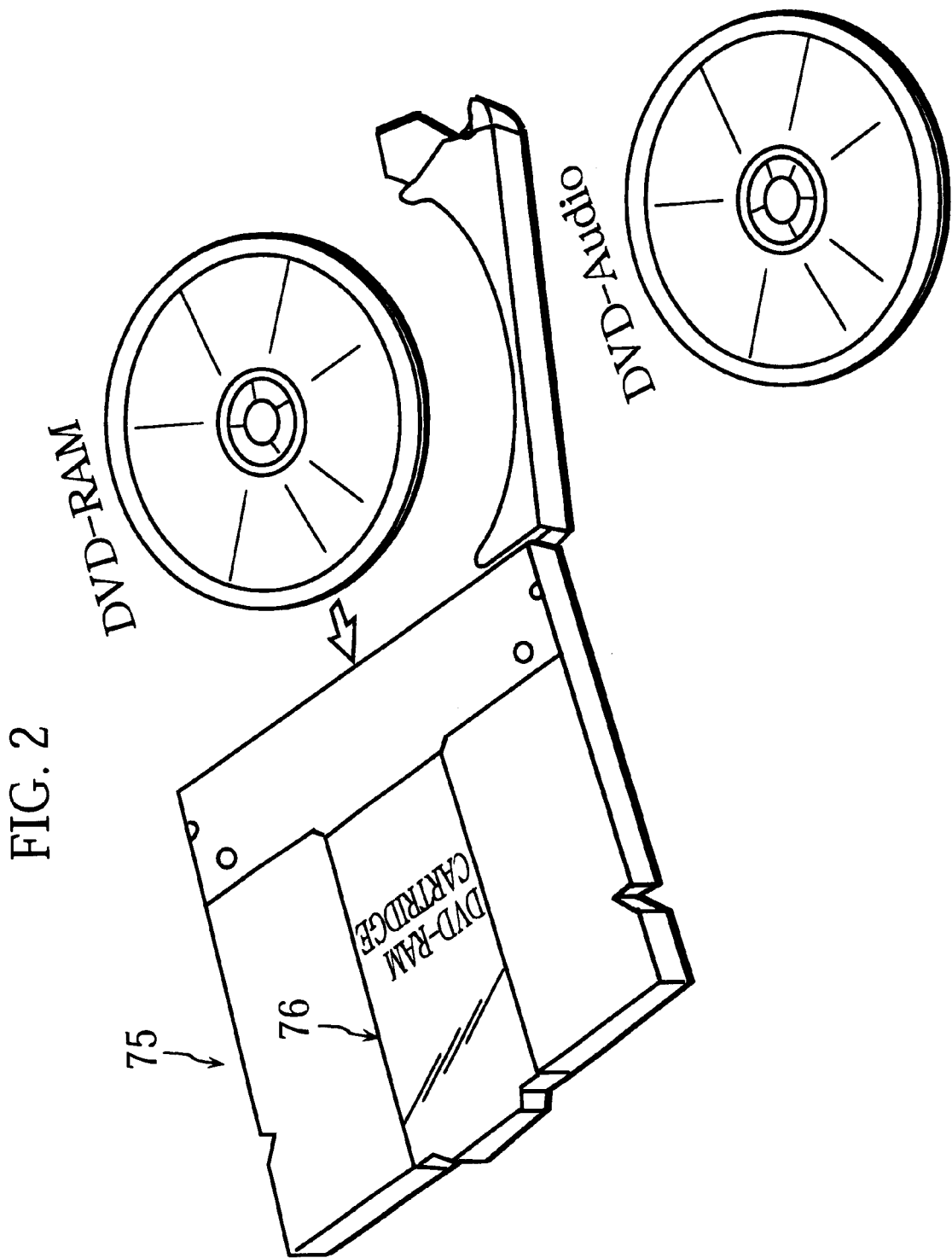
FIG. 2 shows a representation of a DVD-ROM disc and a DVD-RAM disc.

The following is an explanation of the construction and operation of a contents copying system, with reference to the drawings. First, DVD-Audio and DVD-RAM are explained. FIG. 2 shows a representation of a DVD-Audio disc and a DVD-RAM disc. As shown in the drawing, the difference between a DVD-Audio disc and a DVD-RAM disc lies in the fact that the latter is loaded into a disc drive having been inserted in a cartridge 75, in order to protect its recording surface. When the DVD-RAM disc is stored in the cartridge 75, it is accessed by opening and closing a shutter 76. Although DVD-RAM and DVD-Audio differ in this respect, both may be accessed using the same disc drive. In addition, both have a file system compatible with the UDF (Universal Disk Format) standard, and can store audio contents encoded using a format such as LPCM (Linear Pulse Code Modulation) or Dolby Digital (AC-3) along with data files for use by a standard personal computer.

Figure 3:
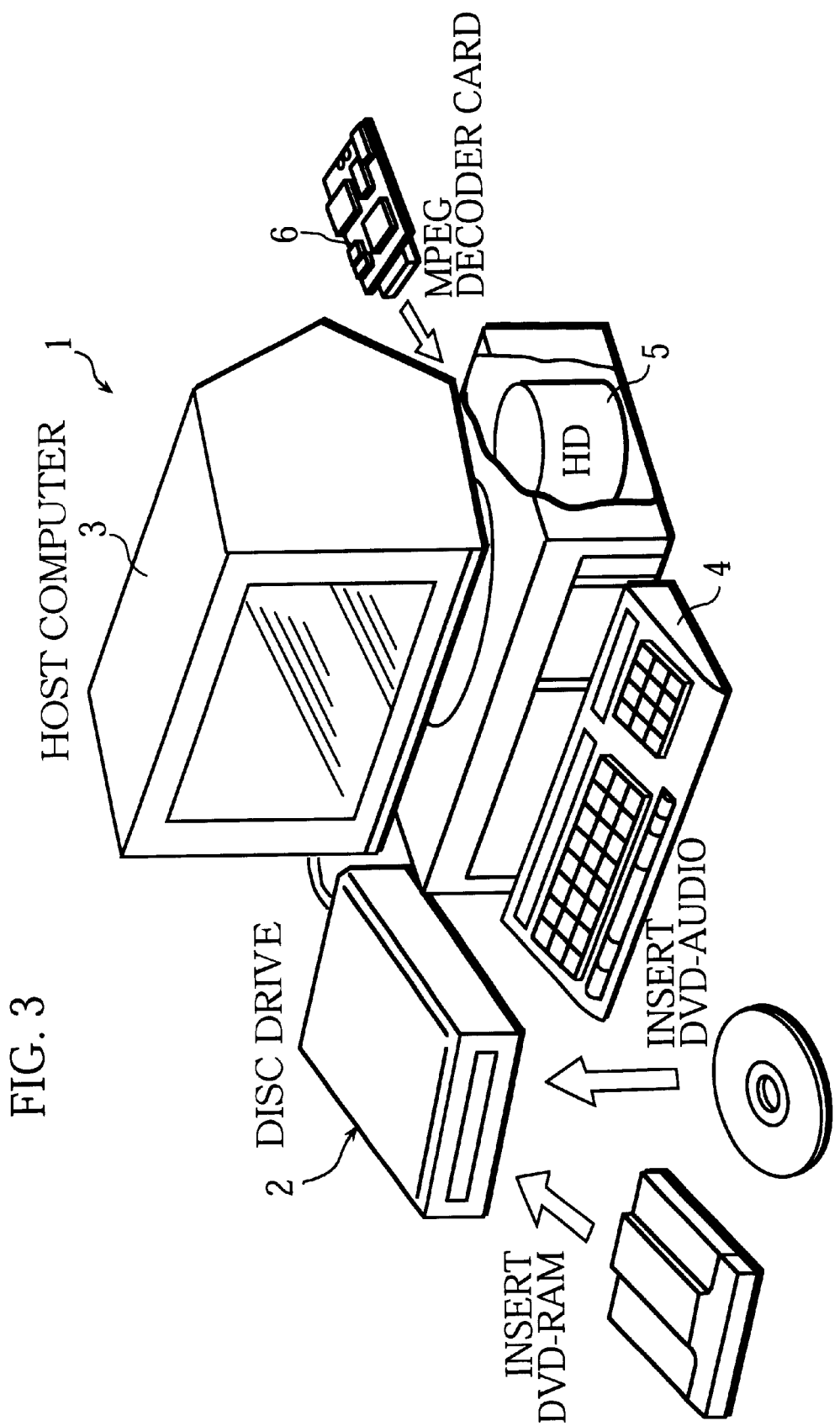
FIG. 3 shows the hardware construction of the contents copying system.

The following is an explanation of the hardware construction of the contents copying system with reference to FIG. 3. As shown in the drawing, the contents copying system is formed from a host computer 1 and a disc drive 2. The host computer 1 is connected to a display 3 and a keyboard 4, and is equipped internally with a hard disk 5 and an MPEG decoder card 6.

FIG. 4 shows the internal construction of the contents copying system. In the drawing, the host computer 1 includes the hard disk 5, the MPEG decoder card 6, a host CPU 7, a bus I/F unit 8, a main memory 9, a processor bus, a PCI (Peripheral Component Interface) bus and an ATAPI (Advanced Technology Attachment Packet Interface)_I/F unit 10. The MPEG decoder card 6 includes a PCI_I/F unit 12, an LSI 13 for performing authentication and descrambling, an audio decoder 14, a D/A converter 15 and a local bus. Note that the MPEG decoder card 6 also includes components such as a video decoder for reproducing video, but, since such components have little connection with the present invention, description is omitted here.

The disc drive 2 includes a spindle motor 17, a pickup 18, a pre-amp unit 19, an error correction unit 20, an ATAPI_I/F unit 21, a servo-motor 22, an EEPROM 23, an LSI 25 for performing authentication, scrambling and descrambling, a control microcomputer 26 and a microcomputer bus. The host computer 1 and the disc drive 2 are connected to each other via ATAPI. However, the host computer 1 and the disc drive 2 may also be connected via an interface conforming to a standard such as SCSI (Small Computer System Interface), IDE (Integrated Drive Electronics), IEEE1394, or USB (Universal Serial Bus).

In the above construction the disc drive 2 and the MPEG decoder card 6 respectively include the LSI 13 and the LSI 25 for performing mutual authentication according to the DVD copyright protection standard. As a result, the disc drive 2 can only transfer title keys to the MPEG decoder card 6.

The following is an explanation of the components (the hard disk 5, the EEPROM 23, the LSI 25 and the LSI 13) which are significant in contents copying.

The hard disk 5 stores encrypted contents read from the disc drive 2 as shown by the broken line in FIG. 4, when a DVD-Audio disc is loaded into the disc drive 2. Then, when a DVD-RAM disc is loaded into the disc drive 2, encrypted contents are read from the hard disk 5 and output to the disc drive 2. FIGS. 5A to 5E show the procedure for reading encrypted contents from the DVD-Audio disc onto the hard disk 5, and writing the encrypted contents on the hard disk 5 onto the DVD-RAM disc.

Figure 5A:
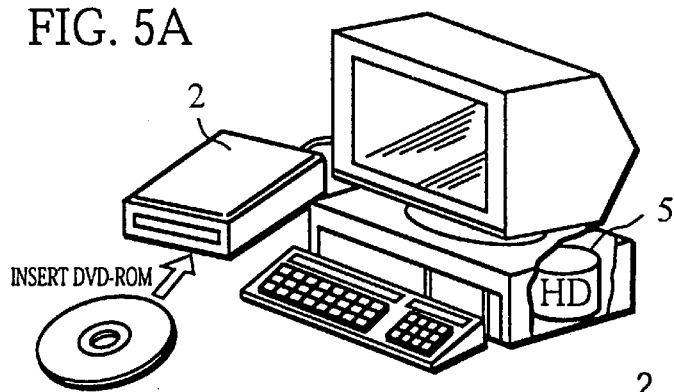
FIGS. 5A to 5E show the procedure for reading encrypted contents from a DVD-Audio disc onto a hard disk 5, and writing the encrypted contents of the hard disk 5 onto a DVD-RAM disc.
Figure 5B:
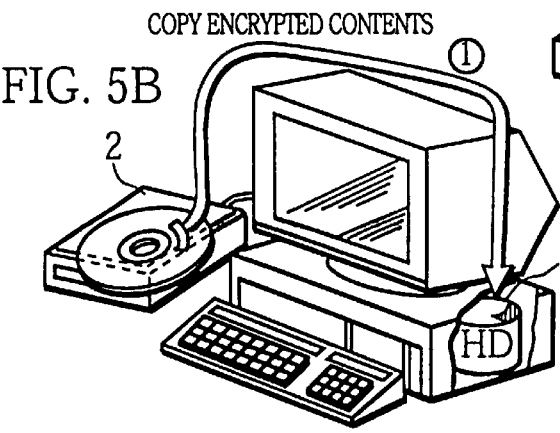
Figure 5C:
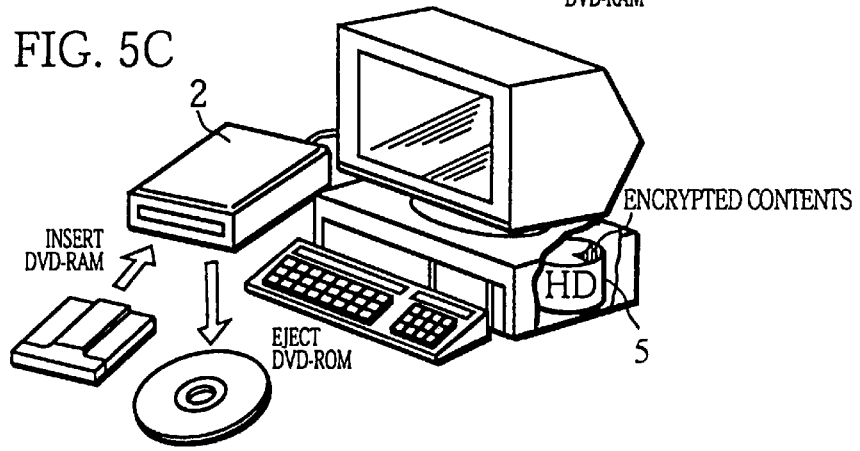
Figure 5D:
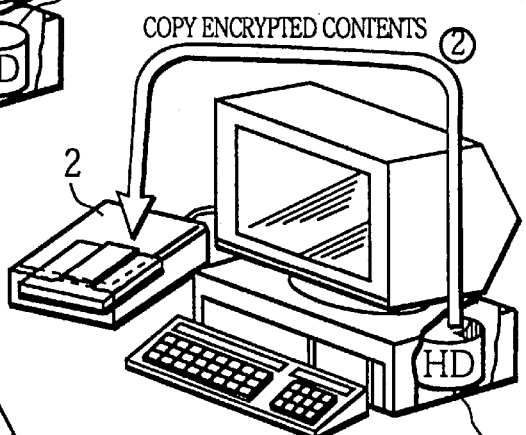
Figure 5E:
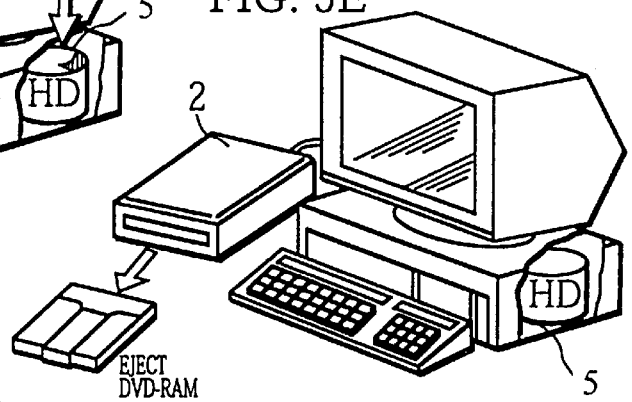

The DVD-Audio disc is inserted into a standard personal computer (FIG. 5A) and encrypted contents are read from the DVD-Audio disc and written in the hard disk 5, as shown by the arrow ①. After the encrypted contents have been written on the hard disk 5, a DVD-RAM disc is inserted in place of the DVD-Audio disc, as shown in FIG. 5C. Following this, in FIG. 5D, the encrypted contents are read from the hard disk 5 and recorded on DVD-RAM, as shown by the arrow ②. The DVD-RAM disc on which the encrypted contents have been recorded is then ejected (FIG. 5E), completing the process for obtaining a duplicate of the encrypted contents recorded on the DVD-Audio disc on the DVD-RAM disc.

In this process, the encrypted contents are temporarily stored on the hard disk 5 (this is referred to as 'temporary contents storage'). However, since the components of the host computer 1 described above, other than the MPEG decoder card 6, do not have a specialized LSI for performing mutual authentication as stipulated by the DVD copyright protection standard, the hard disk 5 can receive and store encrypted contents from the disc drive 2, but cannot receive a title key from the disc drive 2. Even when encrypted contents are stored on the hard disk 5, the hard disk 5 is unable to confirm its own authenticity with the MPEG decoder card 6, or transfer a title key to the MPEG decoder card 6. Therefore, encrypted contents stored on the hard disk 5 cannot be reproduced. Or, to put it another way, in this contents copying system, encrypted contents can only be reproduced from the disc drive 2. This is because the disc drive 2 includes the LSI 25 and is able to transfer the title key to the MPEG decoder card 6. Note that an LSI for performing authentication and scrambling/descrambling is not provided in the hard disk 5 of the present embodiment, but even if such an LSI were provided and the MPEG decoder card 6 accepted the hard disk 5 as a legitimate device, the disc drive 2 still should not transfer the title key to the hard disk 5. This is because if contents were copied together with a title key from the hard disk 5 to a DVD-RAM disc in the disc drive 2, after being legitimately copied onto the hard disk 5 from a DVD-AUDIO disc in the disc drive 2, the copy of the contents made onto the DVD-RAM disc would be a second generation copy. Such second generation copies are often prohibited by the DVD copy protection standard, so that when copying onto the DVD-RAM would count as a second generation copy, it is prohibited by this standard.

The EEPROM (Electrically Erasable Programmable Read-Only Memory) 23 is an embedded semiconductive element that can only be accessed by a secret command, making it a secure recording medium that cannot be accessed from the host computer 1. When contents are copied from a DVD-Audio disc onto DVD-RAM as shown in FIGS. 5A to 5E, the encrypted contents are read from the DVD-Audio disc and stored in the hard disk 5 inside the host computer 1. However, the title key required to decrypt the encrypted contents, and the disc key required to decrypt the title key are stored in the EEPROM 23, without being output from the disc drive 2. In other words, if the operation for copying from DVD-Audio to DVD-RAM shown in FIGS. 5A to 5E is performed, the EEPROM 23 holds the title key and the disc key when the DVD-Audio disc is loaded, and outputs the title key and the disc key to the spindle motor 17, the pickup 18, and the servo-motor 22 when the DVD-RAM is loaded, thereby causing them to be written onto the DVD-RAM. As will be explained below, the encrypted contents may be output from-the disc drive 2, but the title and disc keys cannot be accessed from outside of the disc drive 2 while the copying operation in FIGS. 5A to 5E is being performed, and may only be transferred between the DVD-Audio, DVD-RAM and EEPROM 23 inside the disc drive 2.

The LSI 25 has a holding unit 25-1 for holding a master key, a descrambler 25-2, a mutual authentication unit 25-3 and a scrambler 25-4. The descrambler 25-2 decrypts the disc key using the master key, thereby obtaining the disc key for the DVD-Audio disc, and decrypts the title key using the disc key.

The mutual authentication unit 25-3 performs mutual authentication between the disc drive 2 and a connected device to determine whether the connected device is legitimate.

When the scrambler 25-4 outputs a title key to the MPEG decoder card 6, it encrypts the title key using a session key obtained during the mutual authentication performed by the mutual authentication unit 25-3, and outputs the encrypted title key to the MPEG decoder card 6. When the title key is recorded on DVD-RAM, the scrambler 25-4 encrypts the title key using media ID information unique to the DVD-RAM and outputs the encrypted title key to the spindle motor 17 and the servo-motor 22. The unique media ID information on the DVD-RAM is copied onto a BCA (Burst Cutting Area) during disc manufacture. Whenever a title key is recorded on a DVD-RAM disc it is encrypted using the unique media ID information for that particular disc.

The LSI 13 has a holding unit 13-1 for holding a master key, a mutual authentication unit 13-2 and a descrambler 13-3. The mutual authentication unit 13-2 performs mutual authentication between the MPEG decoder card 6 and a connected device, thereby confirming the legitimacy of the connected device. Once the encrypted title key has been transmitted from a device confirmed to be legitimate, in this case the disc drive 2, to the MPEG decoder card 6, the descrambler 13-3 decrypts the title key using the session key obtained when mutual authentication was performed. Furthermore, once encrypted contents have been transmitted from the authenticated disc drive 2 to the MPEG decoder card 6, the descrambler 13-3 decrypts the contents using the decrypted title key, and reproduces the decrypted contents by outputting them to the audio decoder 14 and the D/A converter 15.

This completes the explanation of the hardware construction of the contents copying system. The following is an explanation of how the recording of contents and the recording of information restricting the number of copies is performed using a DVD-Audio disc, the disc drive 2 and the hard disk 5, along with an explanation of the data construction of the information restricting the number of copies.

FIG. 6 shows the data construction of a read-only DVD-Audio disc. The physical layer of a DVD-Audio disc, like that of a CD, is divided into three areas: a lead-in area 1001, a volume area 1002 and a lead-out area 1003.

The lead-in area 1001 cannot normally be accessed by the user, and stores the title key.

The volume area 1002 is constructed from title management information 1004 and one or more titles 1005 (the disc shown in FIG. 6 contains only one title). The title 1005 contains N song contents 1009 corresponding to a plurality of songs 1 to N, where N≦99. In a DVD-Audio disc, each content 1009 corresponds to audio data for one song, so the title 1005 may correspond, for example, to an album containing N songs.

The title management information 1004 is constructed from a title name 1006, a number of songs 1007 and attribute information 1008 for songs 1 to N.

The title name 1006 is a unique name applying to each title, or to each album.

The number of songs 1007 indicates the number of songs included on the DVD-Audio disc, and is an integer from 1 to 99.

The attribute information 1008 shows the attributes for each content (hereafter each song) 1009, and is constructed from ISRC information 1010, a song name 1011, an artist name 1012, a copy authorization flag 1013, a number of authorized copies 1014 and a record address 1015.

The ISRC (International Standard Recording Code) information 1010 is unique information attached to each song 1009, and is constructed from a country code (two ASCII characters), an owner code (three ASCII characters), year recorded (a two-digit number) and a serial number (a five-digit number).

The song name 1011 and artist name 1012 are character information representing the song name and artist name for each song 1009.

The copy authorization flag 1013 is information indicating whether each song 1009 can be recorded, in other words whether copying is authorized. The copy authorization flag 1013 for a song 1009 whose copying is authorized is set at 0, while that for a song 1009 whose copying is not authorized is set at 1.

The number of authorized copies 1014 applies when the copy authorization flag 1013 for a song 1009 is set at 0, and sets a limit for the number of authorized copies as an integer. When the copy authorization flag 1013 for a song 1009 is set at 1, copying is not authorized, and so the number of authorized copies 1014 is set at 0.

The record address 1015 shows a record address on the DVD-Audio disc for each song 1009. Information for a start of record (SOR) address is recorded in each record address, for example in sector units. Here, one sector is 2048 bytes.

The host computer 1 displays a menu screen like the one shown in FIG. 7 based on the song names 1011, artist names 1012, copy authorization flags 1013, and record addresses 1015. This enables instructions for the copying and reproduction of contents to be received. FIG. 7 shows an interactive screen for receiving such instructions.

In FIG. 7, song names 'Song 1', 'Song 2', 'Song 3', 'Song 4' and 'Song 5' and artist names 'Singer 1', 'Singer 2', 'Singer 3', 'Singer 4' and 'Singer 5' are displayed, along with corresponding playback times '4 min 43 s', '3 min 39 s', '3 min 22 s', '4 min 07 s' and '4 min 15 s' and copy authorization information showing whether copying of each song is authorized. Here, the copy authorization information in each case is 'Yes', showing that copies are authorized.

This information can be displayed by obtaining the song names 1011, artist names 1012 and record addresses 1015 stored on the DVD-Audio disc. For example, the song names 1011 and the artist names 1012 on the DVD-Audio disc can be used as song names 1201 and artist names 1202, while a playback time 1203 for a certain song 1009 is calculated based on the data length from the record address 1015 for that song 1009 until the record address 1015 for a next song 1009. The copy authorization information 1204 is displayed with reference to each copy authorization flag 1013. In this example, the contents of five songs 1009 is shown as being recorded on the DVD-Audio disc. The user can use this information to indicate that songs 1009 on the DVD-Audio disc be copied onto DVD-RAM. Of course, the number of authorized copies can be set for groups of songs 1009 recorded on the DVD-Audio, in other words for each title, so that the user can be made to indicate whether each title is to be copied, rather than each song 1009.

Figure 8:
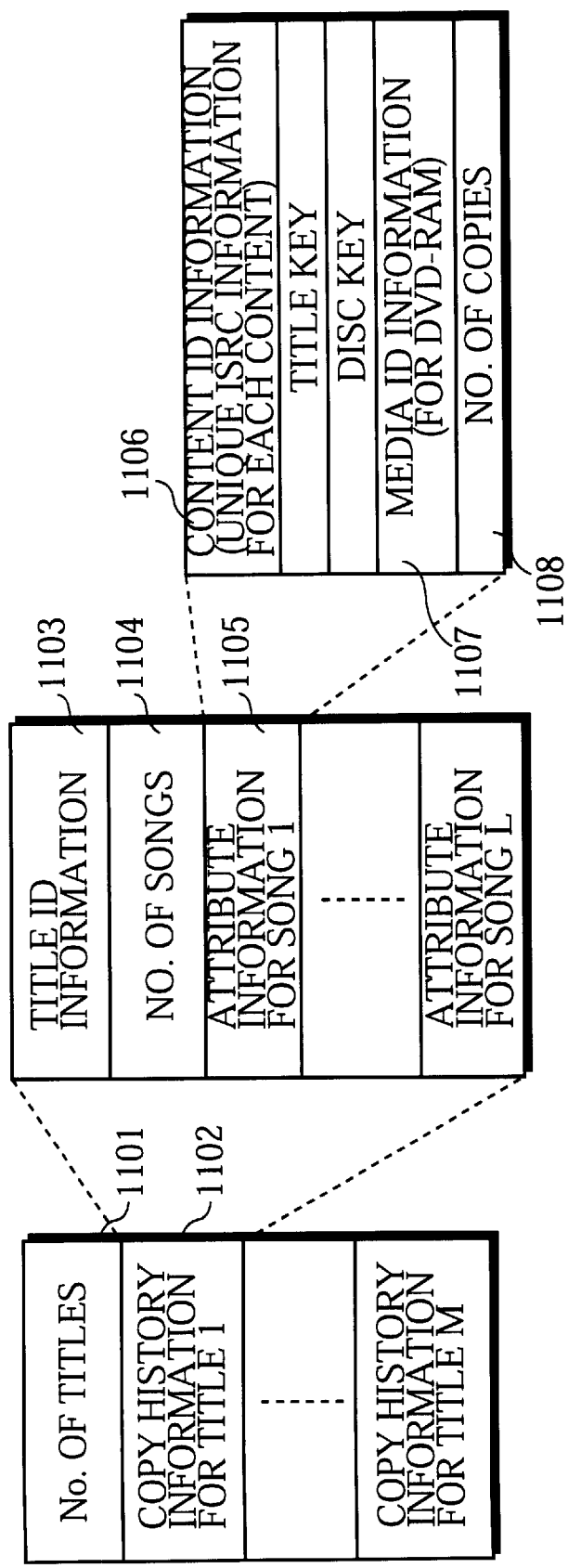
FIG. 8 shows the data construction of title copy history information for a title.

The following explains how information restricting the number of copies is stored in the EEPROM 23. The EEPROM 23 stores copy history information for managing the copy history of each title. Title keys and disc keys are stored in the EEPROM 23 as one element of the copy history information. FIG. 8 shows the data construction of copy history information for each title. In the drawing, the EEPROM 23 stores a number of titles 1101 and copy history information 1102 for titles 1 to M. The copy history information 1102 for each title is formed from title ID information 1103, number of songs 1104, and attribute information 1105 for songs 1 to L. The following is an explanation of each of these items.

The number of titles 1101 represents the number of titles forming the copy object, and is an integer from 0 to 256.

This item records the number of titles that can be copied using the disc drive 2.

In this embodiment, the maximum number of titles whose copy history can be recorded is 256, but the maximum number need not be limited in this way, and may be raised by increasing storage capacity.

The following is an explanation of the copy history information 1102 for each title.

The title ID information 1103 is unique to each title, and is a copy of the title name 1006 on the DVD-Audio disc.

The number of songs 1104 is information showing the number of songs included in each title, and is an integer from 1 to 99. In this embodiment, up to 99 songs can be included in one title, but the number of songs included in one title may be changed by increasing or reducing the amount of storage space in the EEPROM 23.

The attribute information 1105 for each of songs 1 to L is constructed from the content ID information 1106, the title key, a disc key unique to the DVD-Audio disc, the media ID information 1107 and the number of copies 1108.

The content ID information 1106 is unique to each song 1009, and is a copy of ISRC information 1010 on the DVD-Audio disc.

The title key is a cipher key for decrypting the encrypted content.

The disc key is for decrypting the title key, and is a cipher key recorded on the DVD-Audio disc on which the content was originally recorded. Title and disc keys stored in the EEPROM 23 are deleted by the control microcomputer 26 when the limit set for the number of copies 1108 has been reached. Alternatively, the title and disc keys may be deleted whenever copying is performed by the disc drive 2. In the latter case, the title and disc keys must be obtained anew from the DVD-Audio disc each time the user wishes to make a copy, so that the user must have the original DVD-Audio disc in order to be able to make copies. As a result, copying by a user who does not possess an original disc can be prevented even if the number of copies has not reached its limit, and only copying made by the user in possession of the original disc authorized.

The media ID information 1107 is ID information unique to the DVD-RAM onto which contents are to be copied.

The number of copies 1108 represents the number of times a content has been copied using the disc drive 2, and is an integer of 0 or more.

The following is an explanation of an actual example of the attribute information 1105 for each content, as shown in FIG. 9. The drawing shows an example of attribute information for songs 1009. In FIG. 9, songs 1009 having content ID information JPABC9812345 to JPABC9812349 have been recorded on a DVD-RAM MOO1A, and songs 1009 having content ID information JPABC9801234 to JPABC9801236 have been recorded on a DVD-RAM M346B. If the number of copies 1108 for each song is referred to, it can be seen that each has been copied once.

Next, the method for storing contents read from the DVD-Audio disc onto the hard disk 5 when copying from DVD-Audio onto DVD-RAM is explained.

Figure 10:
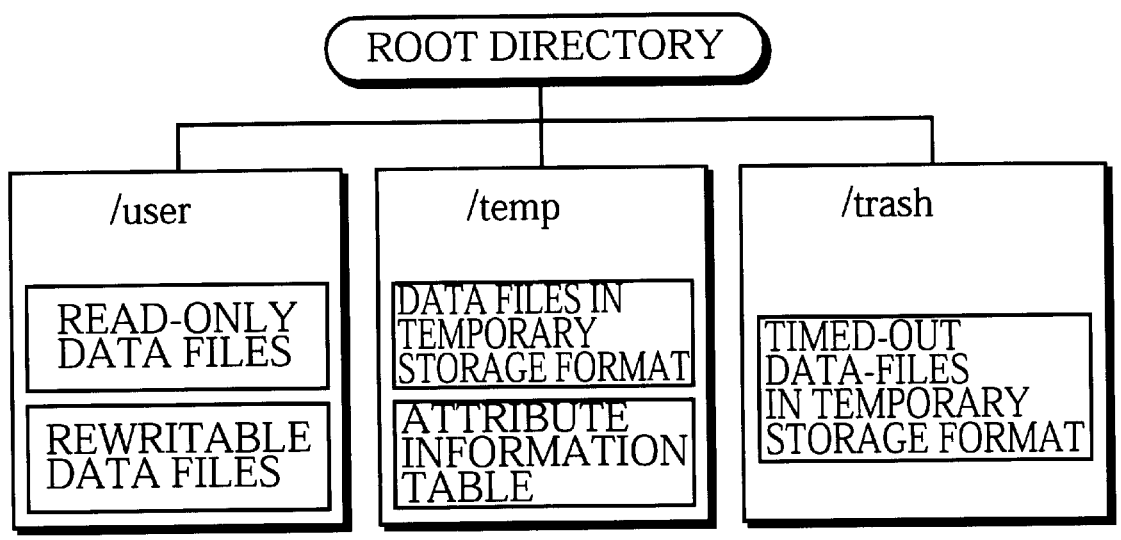
FIG. 10 shows the directory construction of the hard disk 5.

FIG. 10 shows the directory construction of the hard disk 5. The root directory is divided into three directories:/user, /temp and /trash.

The /user directory stores read-only data files and rewritable data files.

The /temp directory manages files used to temporarily store contents on the hard disk 5 (temporary storage files) when copying contents from DVD-Audio to DVD-RAM, and stores contents in temporary storage format and an attribute information table.

Here, a content in temporary storage format may be stored in the directory as a hidden file. Since this means that the existence of the content in temporary storage format cannot be perceived by the user, such content cannot be illegally analyzed.

The following is an explanation of the attribute informatio table storedin the directory/temp.

The attribute information table stores file path information, a file attribute and a time recorded corresponding to each file. The file path information shows the location in the hard disk 5 of files corresponding to digital content. The file attributes show the attributes of files storing the digital content. The times recorded show when these files were stored in the hard disk 5. The attribute information table is stored in the hard disk 5 in a special file format that prevents access and tampering.

An example of an attribute information table is shown in FIG. 11. In the drawing, the attribute information table includes file path information, a file attribute and a time recorded for each data file.

A data file indicated by file path information C:/temp/xxx.dat has been given a 'temporary storage' file attribute. This-data file was recorded on April 1, 1999.

A data file indicated by file path information C:/user/zzz.dat has been given a 'rewritable' file attribute. This data file was recorded on Mar. 20, 1999.

A data file indicated by file path information C:/trash/aaa.dat has been given a 'temporary storage timed-out' file attribute. Temporary storage timed-out indicates that this file previously had a temporary storage attribute, but has exceeded its designated storage time, having been stored in the hard disk 5 for a lengthy period without being recorded on DVD-RAM. As such, this data file is treated as deleted, and stored in the directory C:/trash.

The explanation of the first embodiment is hereafter concluded with a description of the processing sequence used to copy the contents forming a title from DVD-Audio to DVD-RAM in a contents copying system realized by the above hardware construction and data construction. This sequence is described with reference to the flowcharts in FIGS. 12 and 13.

FIGS. 12 and 13 are flowcharts showing the procedure performed by the disc drive 5 when copying contents. The procedure in the flowcharts is written using machine language instructions, and loaded in the control microcomputer 26 as a control program. This means that the control microcomputer 26 controls the processing shown in the flowcharts, and the following is an explanation of the operation used by the control microcomputer 26 to execute this processing.

In FIG. 12, once a user has loaded a portable recording medium into the disc drive 2, the control microcomputer 26 refers to a lead-in area in the loaded recording medium to determine whether the loaded recording medium is a read-only recording medium (DVD-Audio) or a rewritable recording medium (DVD-RAM) (step S1). If the recording medium is DVD-Audio, the control microcomputer 26 reads a title key and a disc key from the lead-in area of the DVD-Audio disc (step S2), and then determines whether title ID information identical to the title ID information recorded on the DVD-Audio is stored in the EEPROM 23 (step S3). If the same information has already been stored in the EEPROM 23, processing ends so as to prevent duplicate copies of the title being made. If the same information is not stored, title copy history information is generated in the EEPROM 23 for the title ID information (step S4) and loop processing is performed using the pair of steps S5 and S6 as a loop control statement. The loop control statement formed by steps S5 and S6 enables the processing content of steps S7 to S12 to be repeated for all of the contents forming the title recorded on the DVD-Audio.

The following is an explanation of the processing performed on each content using the loop processing. First, the control microcomputer 26 refers to the attribute information for the content currently being processed, and determines whether copying is authorized by checking whether the copy authorization flag is set at 0 (Step S7). If the copy authorization flag is not set at 0, copying is prohibited, and the control microcomputer 26 should skip the processing in steps S8,to S12 and move to step S6, but if the flag is 0, it moves to step S8. The control microcomputer 26 then determines whether content ID information the same as that recorded on the DVD-Audio exists in the EEPROM 23 (step S8). If such information exists in the EEPROM 23, duplicate copies should be avoided, and the control microcomputer 26 skips the processing in steps S9 to S12, moving to step S6. If such information does not exist, the control microcomputer 26 reads the content and outputs it to the host computer 1, having it stored in the hard disk 5 (step S9). Next, it reads content ID information from the DVD-Audio (step S10), generates attribute information including content ID information, and sets this information in the copy history information in the EEPROM 23 (step S11). The control microcomputer 26 writes the content ID information, title key and disc key for the content in the generated attribute information, and sets an initial value for the number of copies (step S12). Once this setting is completed, processing returns to step S6. The loop control statement formed by steps S5 and S6 enables the above processing to be repeated for all of the contents in a title recorded on the DVD-Audio.

The host computer 1 stores the content in temporary storage format output from the disc drive 2 in the hard disk 5. At this time, the host computer 1 records a file path, temporary storage attribute and time of storage in the hard disk 5 for the content as a linked set in the attribute information table.

When the content that has been changed to temporary storage format is stored in the hard disk 5, a warning is issued, prompting the user to load the DVD-RAM in the disc drive 2 as soon as possible. The reason for this is that a content in temporary storage format may only be stored in the hard disk 5 for a limited period, and as such should be recorded onto DVD-RAM at the earliest opportunity.

Here, this is accomplished by issuing a warning immediately after the contents have been read from the disc drive 2. Alternatively, the status of the contents shown in the attribute information table may be checked, and the execution of other processing prevented until contents in temporary storage format has been written onto the DVD-RAM.

While a file in temporary storage format is being stored in the host computer 1, the host computer 1 continually checks the current time, thereby determining whether a designated storage time has been exceeded since the file with temporary storage status was stored in the hard disk 5. If the designated storage time has been exceeded, the file in-temporary storage format should be deleted, and stored in the directory/trash as a data file whose temporary storage attribute has been timed out.

This means that a file in temporary storage format stored in the hard disk 5 is only saved for a certain period, meaning that such files cannot be stored for a long period spanning, for example, several days. Items relating to such a file may also be deleted from the attribute information table when the file is deleted. The user may also be permitted to set the upper limit for the designated storage time for such a file.

If the user loads a DVD-RAM disc into the disc drive 2 before the end of the designated storage time, the control microcomputer 26 moves from step S1 to step S13 in FIG. 13, reads recording media ID information from the DVD-RAM (step. S13), and moves to step S14. Steps S14 and S15 are a loop control statement enabling the content of the processing sequence of steps S16 to S25 to be repeated for all of the contents forming a title stored on the hard disk 5.

First, the control microcomputer 26 determines whether the number of copies for a content shown in the attribute information is within the authorized range shown in the copy authorization information (step S16). If it is in the authorized range, the control microcomputer 26 moves to step S18 and carries out the subsequent processing, but if it is not in the authorized range, the control microcomputer 26 determines whether the media ID information in the attribute information is the same as the media ID information for the DVD-RAM onto which the content is to be copied (Step S17). This check is performed when the user has mistakenly deleted a content previously copied onto the DVD-RAM, thereby enabling this content to be reconstructed by giving special authorization for it to be copied from the hard disk 5 onto the DVD-RAM. If the media ID information is not the same, the control microcomputer 26 moves to step S15, but if it is the same, the control microcomputer 26 moves to step S18. The control microcomputer 26 then fetches the title key and disc key from the contents attribute information stored in the EEPROM 23 (step S18). Following this, it has the LSI 25 decrypt the disc key using a master key, and decrypt the title key using the decrypted disc key (step S19). Next, the control microcomputer 26 has the LSI 25 encrypt the decrypted title key using the media ID information (step S20) read the content from the hard disk 5 and record it on DVD-RAM (step S21). After this, the control microcomputer 26 waits until the recording of the content onto DVD-RAM has been properly completed before moving to step S23 (step S22). The microcomputer 26 then determines whether the media ID information for the DVD-RAM onto which the content is to be copied already exists in the attribute information (step S23). If such information does not exist, the control microcomputer 26 increments the number of copies in the attribute information (step S24) and writes the media ID information in the attribute information corresponding to the content (step S25).

Meanwhile, if media ID information for the DVD-RAM onto which the content is to be recorded is determined to exist at step S23, the recording onto DVD-RAM of step S21 is assumed to be for reconstructing a content that was previously recorded onto the DVD-RAM, so that the control microcomputer. 26 skips steps S24 and S25, moving to step S15. The above processing is repeated for all of the contents forming a title stored in the hard disk 5, using the loop processing statement of steps S15 and S16.

In the DVD-Audio data construction shown in FIG. 6, the number of authorized copies 1014 for each content was set in the attribute information. Alternatively, the number of authorized copies 1014 may be set for each title as a whole, and the microcomputer 26 may check the number of authorized copies 1014 for each title. In addition, special authorization for copying a particular content was granted when the media ID information was found to be identical, but this special authorization may alternatively be granted for copying of a particular title as a whole.

Note that the contents copying described in this embodiment should preferably be performed by the disc drive 2 only when special commands are issued by the host computer 1. These special commands are a special read command and a special write command. When a DVD-Audio disc is inserted in the disc drive 2, the special read command indicates to the disc drive 2 that an encrypted content, a title key and a disc key should be read from the DVD-Audio disc, the title key and the disc key separated from the encrypted content and stored inside the disc drive 2, and only the encrypted content output.

When a DVD-RAM disc is inserted in the disc drive 2, the special write command indicates that the encrypted content stored in the hard disk 5 should be output to the disc drive 2, and this content recorded on the DVD-RAM disc along with the title key and disc key stored inside the disc drive 2.

The host computer 1 may alternatively be equipped with a copy command, for successively executing the special read command and the special write command.

In the embodiment described above, the playback and record functions can be combined in one disc drive, which may be connected to a host computer 1 having a hard disk 5, enabling contents to be copied from DVD-Audio to DVD-RAM. This removes the need for the user to acquire two disc drives, allowing contents to be copied at low cost. Furthermore, copying of contents encrypted using a title key is performed here by reading a content from DVD-Audio onto the hard disk 5 and then writing the content on the hard disk 5 onto DVD-RAM. The title key itself, however, is not recorded on the hard disk 5. In other words, since the title key is not copied together with the content, a content copied from the hard disk 5 to DVD-RAM cannot be defined as a generation copy, so that copying from DVD-Audio to the hard disk 5 in the host computer 1 does not fall within the definition of contents copying as described by the DVD copyright protection standard. As a result, copying from DVD-Audio to DVD-RAM can still be performed even if generation copies are prohibited according to the CCI in the DVD-Audio standard.

Second Embodiment

In the first embodiment, a content encrypted by the title key was read from DVD-Audio and stored in its encrypted state in the hard disk 5 of the host computer 1 by the disc drive 2. However, in the second embodiment, a content that has been encrypted using the title key is first decrypted, and then reencrypted using a different cipher key (the temporary storage key) before being output to the host computer 1, where it is stored in the hard disk 5. Since the content stored in the hard disk 5 has been encrypted using the temporary storage key, when it is read from the hard disk 5 it is first decrypted using the temporary storage key and then encrypted again using the title key, before being recorded on DVD-RAM as described in the first embodiment.

When a content is stored temporarily on the hard disk 5 in this embodiment, it is encrypted using a different cipher key to the title key, so that the chances of the title key being exposed if the content stored in the hard disk 5 is illegally analyzed are reduced.

The present invention has been explained in terms of the above embodiments, but these are just two examples of a system capable of obtaining satisfactory results under current conditions. Alternatives are possible, as long as they do not deviate from the essential points of the invention as disclosed in the embodiments. The following examples (a) to (d) may be considered as representative alternatives.

(a) In the embodiments, the procedure performed by the control microcomputer 26, explained with reference to the flowcharts in FIGS. 12 and 13, is realized by a program written in machine language. This program may also be recorded on a recording medium as an object to be distributed or sold. Various types of recording medium, such as IC cards, optical discs and floppy disks may be used, provided that the machine language program stored on them may be used by a standard personal computer. This computer executes the machine language program in sequence, thereby realizing the functions of the recording apparatus shown in the embodiments.

(b) DVD-Audio is given as one example of an original recording medium to be copied, but in this alternative the recording medium is not limited in this way, similar effects being obtainable from any read-only recording medium, such as CD-ROM. Similarly, DVD-RAM is given as one example of a recording medium onto which copies could be made, but this alternative does not limit the recording medium in this way, similar effects being obtainable from any writable recording medium, such as CD-R (CD-Recordable), MO (Magneto-Optical) and FD (Floppy Disk). Alternatively, the recording medium in either case need not be an optical disc and can be semi-conductive memory or the like.

(c) The contents described as being copied in the embodiments are limited to audio data, but may also be video data, character data or a mixture of data including video data, character data and audio data.

(d) In the embodiments, copying is prohibited when it is not authorized by the copy authorization flag, or when the number of copies authorized by the copy authorization information for either content or title has been made using the disc drive 2.

Alternatively, copying may be authorized by degrading the number of channels or the bit rate, so that only copies inferior to the original can be made.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A content copying system, including a host computer and a disc drive, that makes first generation copies, but prohibits second and further generation copies, said disc drive comprising:

a first means for reading, when a first recording medium has been loaded, an encrypted content and a cipher key from the first recording medium, transmitting the encrypted content to the host computer and storing the cipher key inside the disc drive; and a second means for obtaining, when a rewritable second recording medium is loaded after the first recording medium has been loaded, the encrypted content from the host computer and the cipher key stored inside the disc drive, and recording the obtained encrypted content and cipher key onto the second recording medium, wherein the host computer includes:

a warning unit that prompts a user, once the encrypted content has been transmitted to the host computer, to load the second recording medium in the disc drive;

a timing means for measuring the current time;

a designated period determining means for determining whether a designated period has passed since the encrypted content was transmitted to the host computer, by referring to the current time measured by the timing means; and a deleting means for deleting the encrypted content if the designated period has passed.

2. A host computer controlling a disc drive and comprising:

a first means for instructing the disc drive to read, when a first recording medium has been loaded, an encrypted content and a cipher key from the first recording medium, and store the cipher key inside the disc drive before outputting only the encrypted content;

a storage means for storing the encrypted content output from the disc drive; and a second means for outputting, when a rewritable second recording medium is loaded after the first recording medium has been loaded, the encrypted content stored in the storage means to the disc drive, and recording the encrypted content, and the cipher key stored in the disc drive onto the second recording medium;

a warning means that prompts a user, once the encrypted content has been stored in the storage means, to load the second recording medium in the disc drive;

a timing means for measuring the current time;

a designated period determining means for determining whether a designated period has passed since the encrypted content was stored in the storage means, by referring to the current time measured by the timing means; and a deleting means for deleting the encrypted content if the designated period has passed.

\* \* \* \* \*